United States Patent [19]

Bergeson et al.

[11] Patent Number: 5,051,996
[45] Date of Patent: Sep. 24, 1991

[54] BUILT-IN-TEST BY SIGNATURE INSPECTION (BITSI)

[75] Inventors: Gary C. Bergeson; Richard A. Morneau, both of Idaho Falls, Id.

[73] Assignee: The United States of America as represented by the United States Department of Energy, Washington, D.C.

[21] Appl. No.: 328,917

[22] Filed: Mar. 27, 1989

[51] Int. Cl.$^5$ .......................................... G06F 11/00
[52] U.S. Cl. .................................. 371/22.4; 371/15.1; 371/25.1; 371/27
[58] Field of Search .................... 371/22.4, 22.5, 22.1, 371/22.3, 22.6, 25.1, 27, 15.1; 324/73.1

[56] References Cited

U.S. PATENT DOCUMENTS

| | | | |
|---|---|---|---|
| 4,183,460 | 1/1980 | Yuen | 371/22.4 |
| 4,580,274 | 4/1986 | Debany | 371/22.4 X |
| 4,598,401 | 7/1986 | Whelan | 371/22.4 |
| 4,817,093 | 3/1989 | Jacobs | 371/22.4 X |
| 4,881,229 | 11/1989 | Kaltbeitzel | 371/25.1 X |
| 4,897,842 | 1/1990 | Herz | 371/22.4 |
| 4,910,735 | 3/1990 | Yamashita | 371/22.4 |

Primary Examiner—Jerry Smith
Assistant Examiner—Robert W. Beausoliel
Attorney, Agent, or Firm—Bradley W. Smith; John M. Albrecht; William R. Moser

[57] ABSTRACT

A system and method for fault detection for electronic circuits. A stimulus generator sends a signal to the input of the circuit under test. Signature inspection logic compares the resultant signal from test nodes on the circuit to an expected signal. If the signals do not match, the signature inspection logic sends a signal to the control logic for indication of fault detection in the circuit. A data input multiplexer between the test nodes of the circuit under test and the signature inspection logic can provide for identification of the specific node at fault by the signature inspection logic. Control logic responsive to the signature inspection logic conveys information about fault detection for use in determining the condition of the circuit. When used in conjunction with a system test controller, the built-in test by signature inspection system and method can be used to poll a plurality of circuits automatically and continuous for faults and record the results of such polling in the system test controller.

16 Claims, 10 Drawing Sheets

BUILT-IN-TEST BY SIGNATURE INSPECTION (BITSI)

CONTRACTUAL ORIGIN OF THE INVENTION

The United States Government has rights in this invention pursuant to Contract No DE-AC07-76ID01570 between the United States Department of Energy and EG&G Idaho,

BACKGROUND OF THE INVENTION

This invention relates to fault detection in electronic circuits and in particular to augmenting an electronic circuit with a fault detection system that can automatically and continuously test the circuit The reliance placed on electronic devices coupled with the increasing complexity of such devices establishes a need for an efficient and reliable means for determining whether there is a fault in an electronic circuit. Electronic circuitry that is used for navigation or weapons systems must have a high degree of reliability. An example of such a system is the Firefinder Doppler Filter circuit from the U.S. Army's AN/TPQ-36 radar signal processor subsystem. It is a concern with such systems that all faults are detected so that the circuit can be replaced or repaired. In such usages, it is also important to detect any intermittent faults because of the high degree of reliability demanded. Accordingly, it is very useful to be able to perform inspections on a regular, even continuous basis and to implement inspection into a technique that the circuit can perform automatically or under the control of a central computer that monitors and initiates self-inspection techniques for many circuits in a system or in several systems.

A methodology for accomplishing this type of fault detection is known as microdiagnostics. Microdiagnostics is a guided probe, troubleshooting technique based on software signature analysis, and is fully described by G. C. Bergeson in *Microdiagnostics for Prototype Instrumentation*, EGG-EA-7091, November 1985. The microdiagnostics approach relies on a human operator to correctly position a test probe at a given node of the printed circuit board under test. Since the fault diagnosis depends on the human operator, it is susceptible to human error and is slowed by human response time. In addition, microdiagnostics utilizes a software generated stimulus which usually operates at a slower rate than the normal system clock. These limitations can severely limit the reliability and utility of the microdiagnostics methodology.

Another concern with fault detection techniques is to apply it to existing equipment. Design of new circuits can account for self-diagnosis using current techniques. However, the need for self-implementing fault detection also applies to existing equipment that would be expensive and inefficient to replace. Although retrofitting is never as efficient as implementing a technique as part of the design process, the ability to retrofit a self-implementing fault detection technique can be very cost-effective for existing equipment which may have a history of repeated failure, but which cannot be immediately replaced.

Therefore, it is an object of the present invention to automate the microdiagnostics guided probe technique using a high-speed, hardware-based approach.

It is a further object of this invention to provide a built in device that is capable of applying a stimulus to a printed circuit board under test, analyzing the resulting circuit response, and isolating the associated fault if the response is abnormal.

It is a still further object of this invention to isolate a detected fault to a single integrated circuit package or small group of integrated circuits on a printed circuit board.

It is another object of this invention to totally automate the procedure of applying a test stimulus and interpreting the test data in a microdiagnostics methodology.

It is a still further object of this invention to provide a built-in circuit fault detection device that uses no external test equipment, requires no human interaction, and operates at the normal circuit speed in order to detect hard faults, dynamic faults, and timing faults.

It is a still another object of this invention to provide a circuit fault device that is capable of interfacing to a system level test controller, that can respond to test commands issued by the system test controller and that can communicate fault locations back to the controller where operational decisions can be made based on the discovered faults.

Still another object of this invention is to provide a circuit fault detection system that can diagnose itself for faults.

A still further object of this invention is to provide a circuit fault detection system that can be retrofitted to existing equipment.

It is another object of this invention to empirically determine the degree of fault coverage attained in the fault detection system.

It is another object of this invention to provide a fault detection system that is relatively simple and efficient so that it can be easily implemented into existing equipment at reasonable cost.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention is a system and method for fault detection for electronic circuits. A stimulus generator sends test signals to the input of the circuit under test. Signature inspection logic compares the resultant circuit response from test nodes on the circuit to an expected response. If the response is incorrect, the signature inspection logic sends a signal to the control logic for indication of fault detection in the circuit. A data input multiplexer between the test nodes of the circuit under test and the signal inspection logic can provide the capability for identification of the specific node at fault by the signature inspection logic. Control logic responsive to the signature inspection logic conveys information about fault detection for use in determining the condition of the circuit.

DETAILED DESCRIPTION OF THE INVENTION

Figure 1:
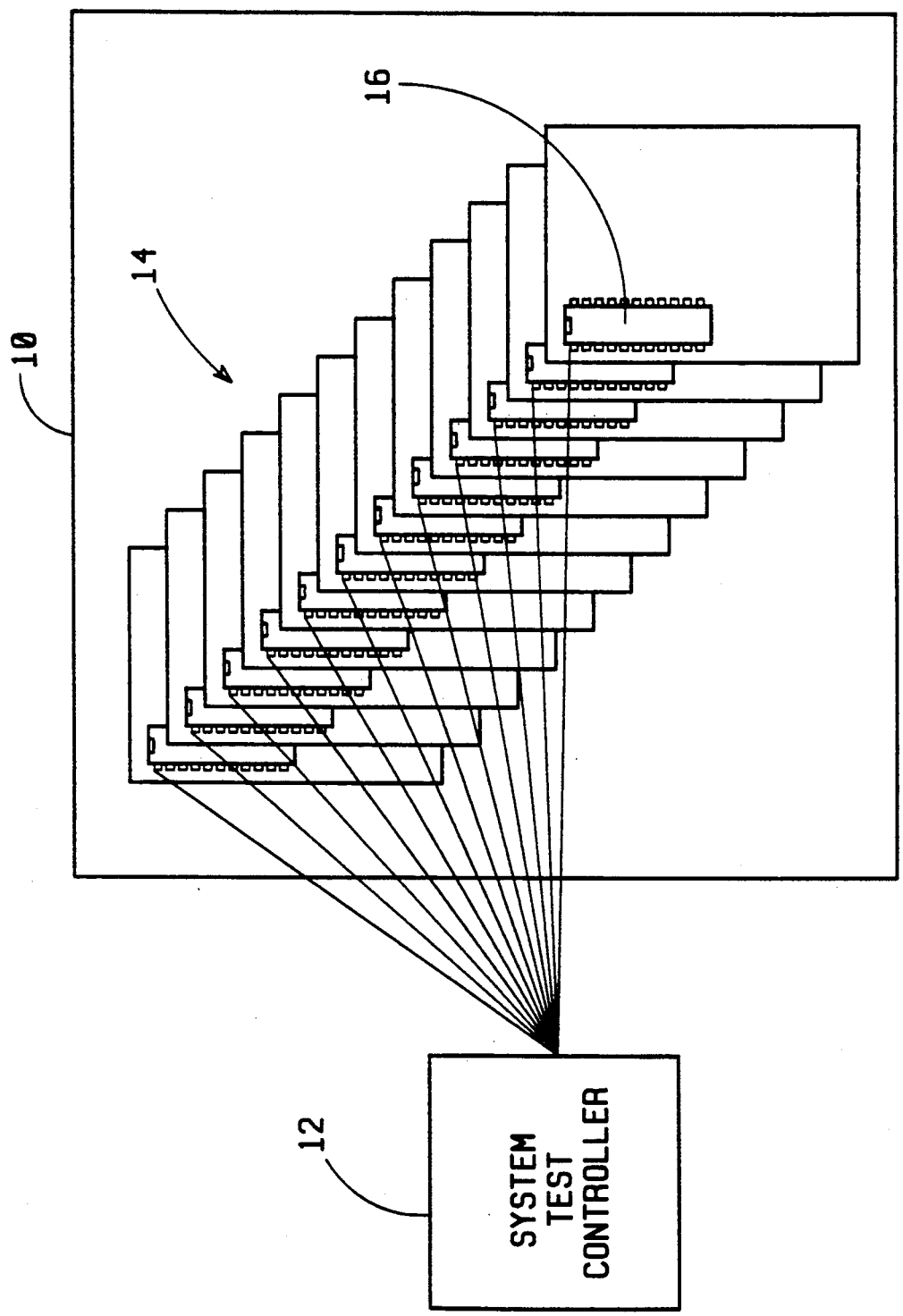
FIG. 1 depicts a block diagram illustrating the SMARTBIT (Smart Built-In-Test) system

The invention was designed for use with the Firefinder Doppler Filter circuit from the U.S. Army's AN/TPQ-36 radar signal processor subsystem although it has application to any digital system or component board The present invention can be used in individual circuits, however it has particular utility when used in a system having a large number of individual circuits Such a system is depicted in FIG. 1. FIG. 1 illustrates the SMARTBIT (Smart Built-In-Test ) system SMARTBIT refers to the combined implementation of the system test controller 12 and the BITSI fault module 16 on each printed circuit board 14, as shown in FIG. 1. The "smart" element of the implementation is the system test controller 12 and the Built-In-Test (BIT) portion is the fault sensing BITSI hardware 16 on each printed circuit board 14.

FIG. 1 shows two main blocks comprising a system under test 10 and the system test controller 12. The system under test 10 is comprised of a number of printed circuit boards 14 which are not necessarily alike. Physically located on each printed circuit board is the built-in test by signature inspection (BITSI) hardware module 16. As used herein, the methodology used to implement the fault sensing system of the present invention is referred to as Built-In-Test by Signature Inspection (BITSI). Each module 16 is coupled to the system test controller 12. Upon command from the system test controller 12, the BITSI fault sensing module 16 performs tests on each of the printed circuit boards 14 and ca isolate faults down to an individual node on the associated printed circuit board 14. The BITSI fault sensing module 16 will then report the fault back to the system test controller 12. The system test controller 12 can range in size from a small imbedded microprocessor to a large computer capable of modeling the system under test to predict fault consequences. Consequence prediction can be displayed to operators in terms of reduced functionality of their system. At a minimum, the system test controller 12 successively compares fault reports with previous reports to discriminate between hard system failures, intermittent failures, or false alarms generated from outside transient interference sources. The system test controller 12 can maintain a history of reported faults which can be used to make decisions concerning the nature of fresh fault data received from the BITSI fault modules. Based on the nature of the fault, the system test controller 12 can initiate action required to continue normal operation, such as switching to redundant backup systems. Since each BITSI module 16 is independent, the system test controller 12 can request fault data from all system printed circuit boards 14 simultaneously.

The operation of the system test controller 12 to include the aforementioned functions is considered well known in the art. The present invention concerns the implementation of the BITSI module that can be included on each printed circuit board or other electronic component. The present invention is also considered to include a system test controller to the extent that such a device can be used with or may be necessary to the operation of the built-in test by signature module. The BITSI methodology incorporates a digital data compression technique called "Signature Analysis", developed by Hewlett-Packard Corporation in 1977. Signature analysis uses the principle that a fault-free digital circuit initialized to a known state will produce the same response when stimulated repeatedly by the same set of input test vectors. A signature analyzer provides a method of compressing the circuit response from lengthy bit streams into a short 10 to 20-bit signature. A signature is generated by connecting the input line of the signature analyzer to a node of the circuit under test. The circuit is then stimulated while the resulting circuit activity at the test node is compressed by the signature analyzer Faults are detected when the circuit fails to produce the known good signature expected at the node under test. As long as the circuit is initialized to the same state prior to applying the input test vectors, the same signature will be produced unless a fault exists in the circuit. The theory of signature analysis is further explained in Bergeson, supra; Hewlett-Packard Corp., *A Designer's Guide to Signature Analysis,* Application Note 222, October 1980; Hewlett-Packard Corp., *Guidelines for Signature Analysis. Understanding the Signature Measurement,* Application Note 222-4, January 1981; G. Gordon and H. Nadig, "Hexadecimal Signatures Identify Troublespots in Microprocessor Systems," *Electronics,* Mar. 3, 1977; R. A. Frohwerk, "Signature Analysis A New Digital Field Service Method," *Hewlett-Packard Journal,* May 1977; and H. Nadig, "Signature Analysis - Concepts, Examples, and Guidelines," *Hewlett-Packard Journal,* pp. 15–21, May 1977.

Figure 2:
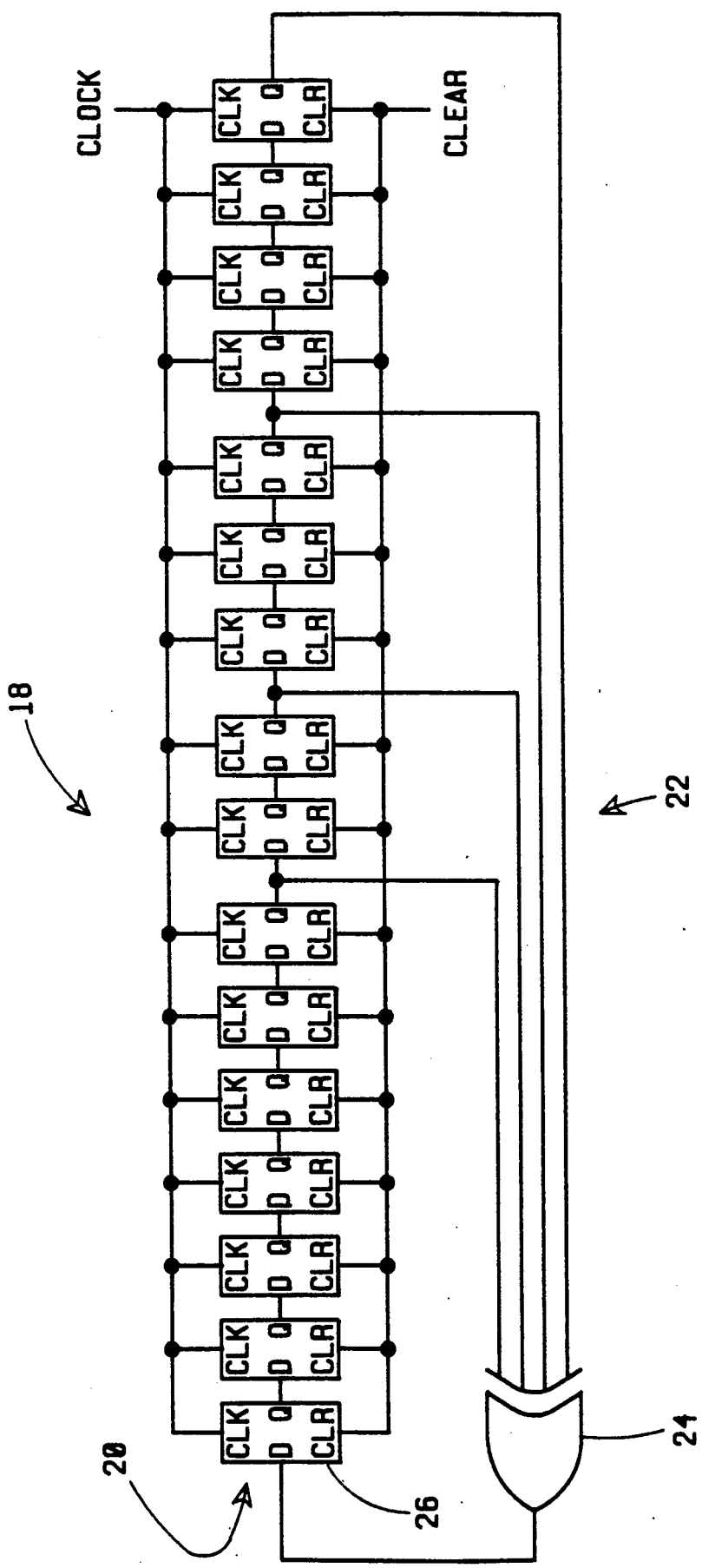
FIG. 2 depicts a typical linear feedback shift register used by a signature analyzer to compress data

Referring to FIG. 2, there is depicted a typical LFSR (linear feedback shift register) 18 used by a signature analyzer to compress data. LFSR 18 comprises a 16-bit shift register 20 with feedback taps 22. The feedback taps 22 are fed through an Exclusive Or gate 24, whose output is fed into the first bit 26 of shift register 20. The feedback taps 22 of the LFSR 18 are selected such that when the n-bit shift register is clocked, all possible $2^n - 1$ bit combinations will be produced before the sequence repeats. A linear feedback shift register which repeats after exactly $2^n - 1$ clock pulses is termed "maximal length." For example, the 16-bit LFSR 18 shown in FIG. 2 will produce all possible $2^{16} - 1 = 65,535$ 16-bit combinations, providing the shift register 20 is initialized to some value other than a string of 16 zeros. Selection of feedback taps is discussed in Frohwerk, supra.

Figure 3:
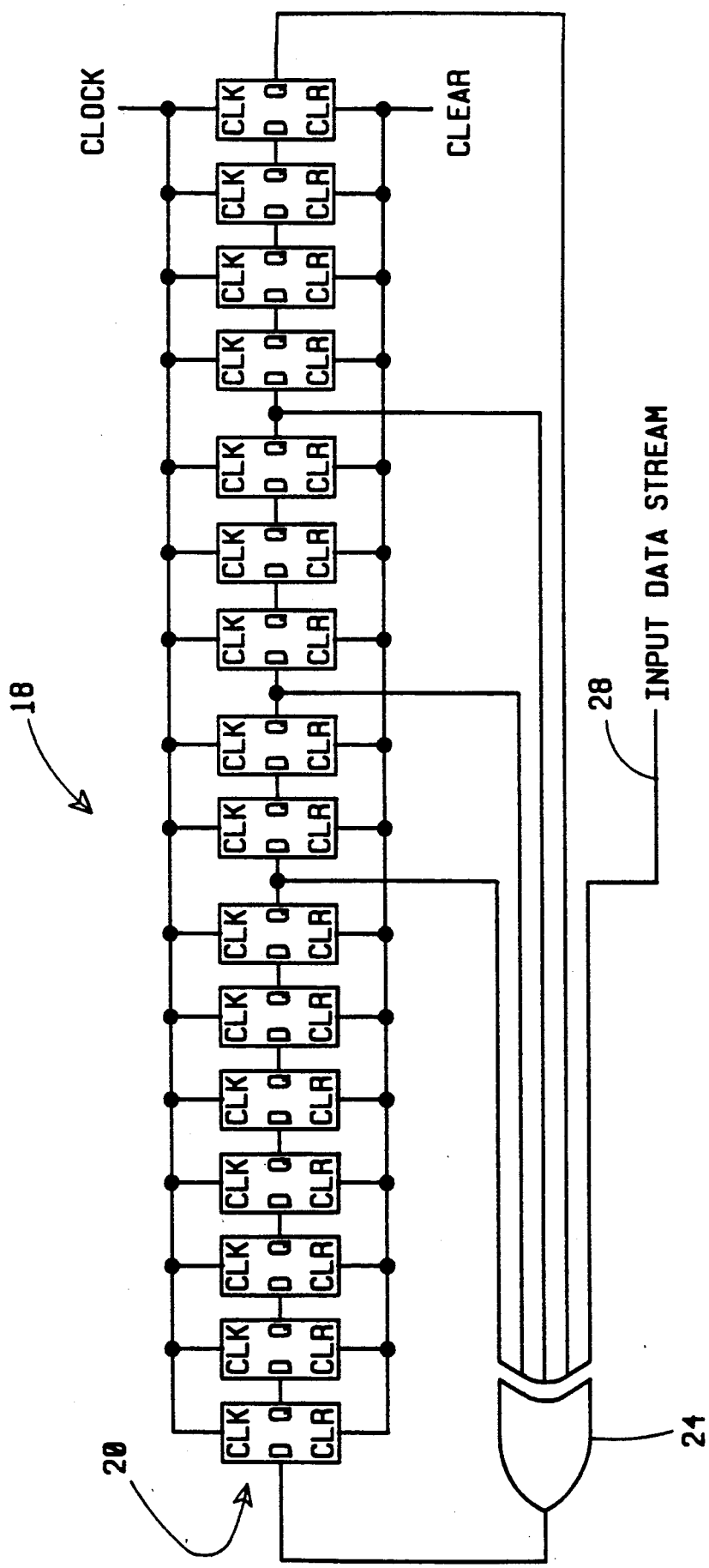
FIG. 3 depicts a serial signature analyzer.

Referring to FIG. 3, an input line 28 is provided into the Exclusive Or gate 24. The LFSR 18 now functions as a signature analyzer. The input data stream conveyed by input line 28 can be any length and will influence the contents of the shift register 20. After clocking the data stream into the LFSR 18, only the residue remaining in the shift register 20 is considered. This n-bit residue is called the signature of the input data. If the input data sequence changes, the signature will also change. Thus, when the input line 28 of a signature analyzer is connected to a circuit node, it can detect errors in the data stream produced at the node.

Frohwerk, supra, shows that a signature analyzer of length n will detect all errors in the data stream if the length of the data stream m is less than n. This follows since the input data will not be shifted beyond the length of the shift register and all data is preserved. For data streams of greater than n bits in length, the probability that an erroneous data stream will map into the same signature as the good data stream is:

$$\frac{2^{(m-n)} - 1}{2^m - 1}$$

For long bit sequences where m is much larger than n, this probability becomes:

$$\frac{1}{2^n}$$

For example, with large m and using the signature analyzer of FIG. 3, the probability P, of detecting an error in a long bit stream is:

$$P = \left(1 - \frac{1}{2^{16}}\right) \times 100 = 99.9985\%$$

Figure 4A:
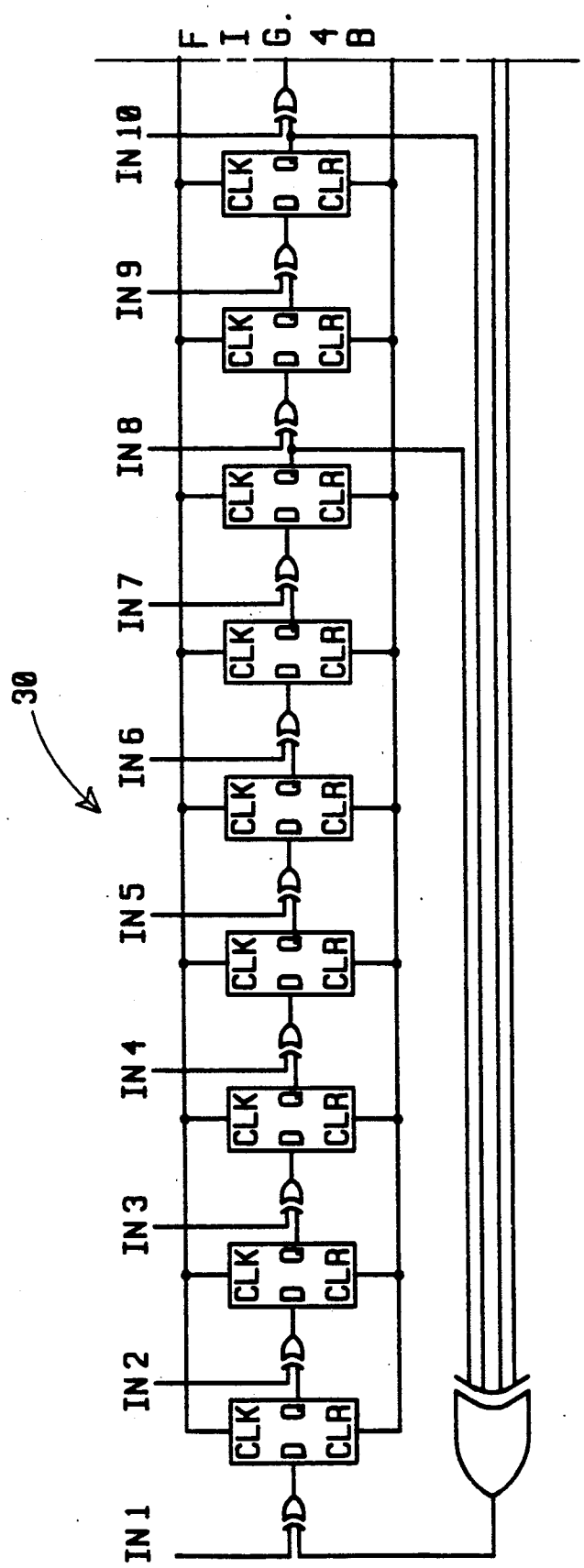
FIG. 4a depicts the first of a two part diagram of parallel signature analyzer.
Figure 4B:
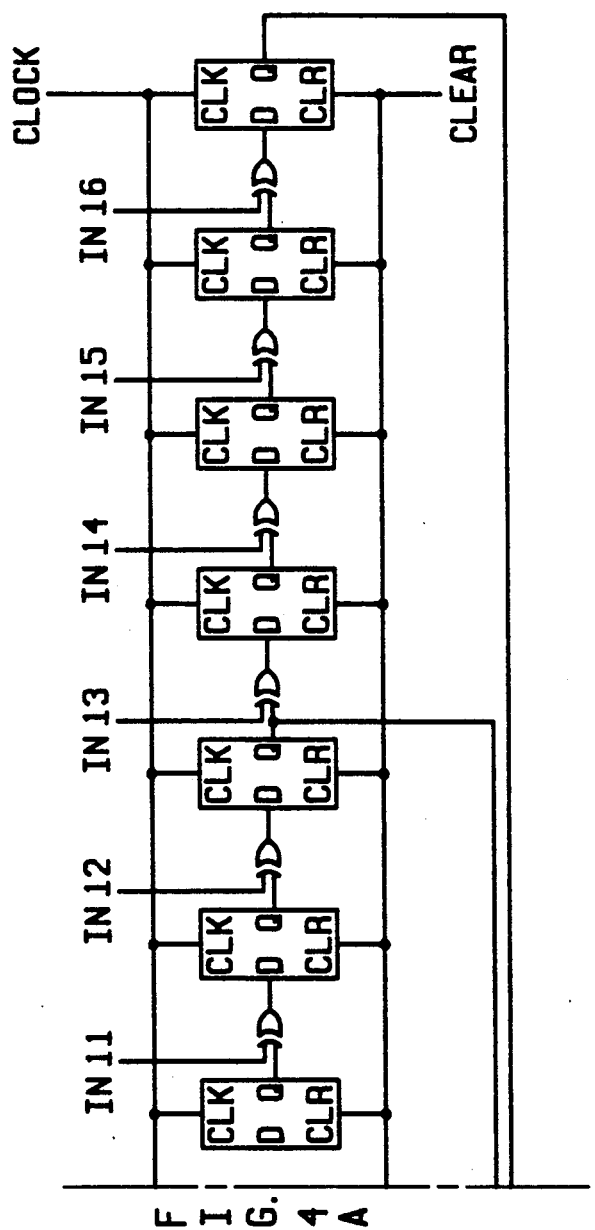
FIG. 4b depicts the second part of the parallel signature analyzer.

The probability figure proves that signature analyzers are very accurate in detecting bad digital data in the input data stream Signature analysis can achieve very high levels of fault coverage if the circuit stimulus propagates a high percentage of all possible faults to an observable circuit node Thus, fault coverage of signature techniques depend on the ability of the circuit stimulus to include the effects of a circuit fault in the input data stream The signature analyzer shown in FIG. 3 is a serial signature analyzer (SSA) since it monitors only one input line. A 16-bit PSA (parallel signature analyzer) is shown in FIGS. 4a and 4b. The PSA is capable of monitoring n input lines simultaneously. In applications where data width is greater than one, the multiple input data compression capability of the PSA is ideal. However, if fault isolation is required to an individual input line, the PSA cannot determine which of the n input lines has generated the error. The present invention can utilize either the parallel or serial signature analyzer If component level isolation of fault is desired, the SSA technique is appropriate. However, if all that is required is fault detection (go/no-go), the PSA is the appropriate choice More information on PSA fault detection theory can be found in "Analysis and Simulation of Parallel Signature Analyzers," by T. Sridhar, D. S Ho, T. J. Powell, and S. M. Thatte, 1982 *IEEE Test Conference*, Paper 22.3, pp. 656–661 and "Self-Testing by Polynomial Division," by D. K. Bhavsar, Richard W. Heckelman, 1981 *IEEE Test Conference*, Paper 9.2, pp. 208–216.

Figure 5:
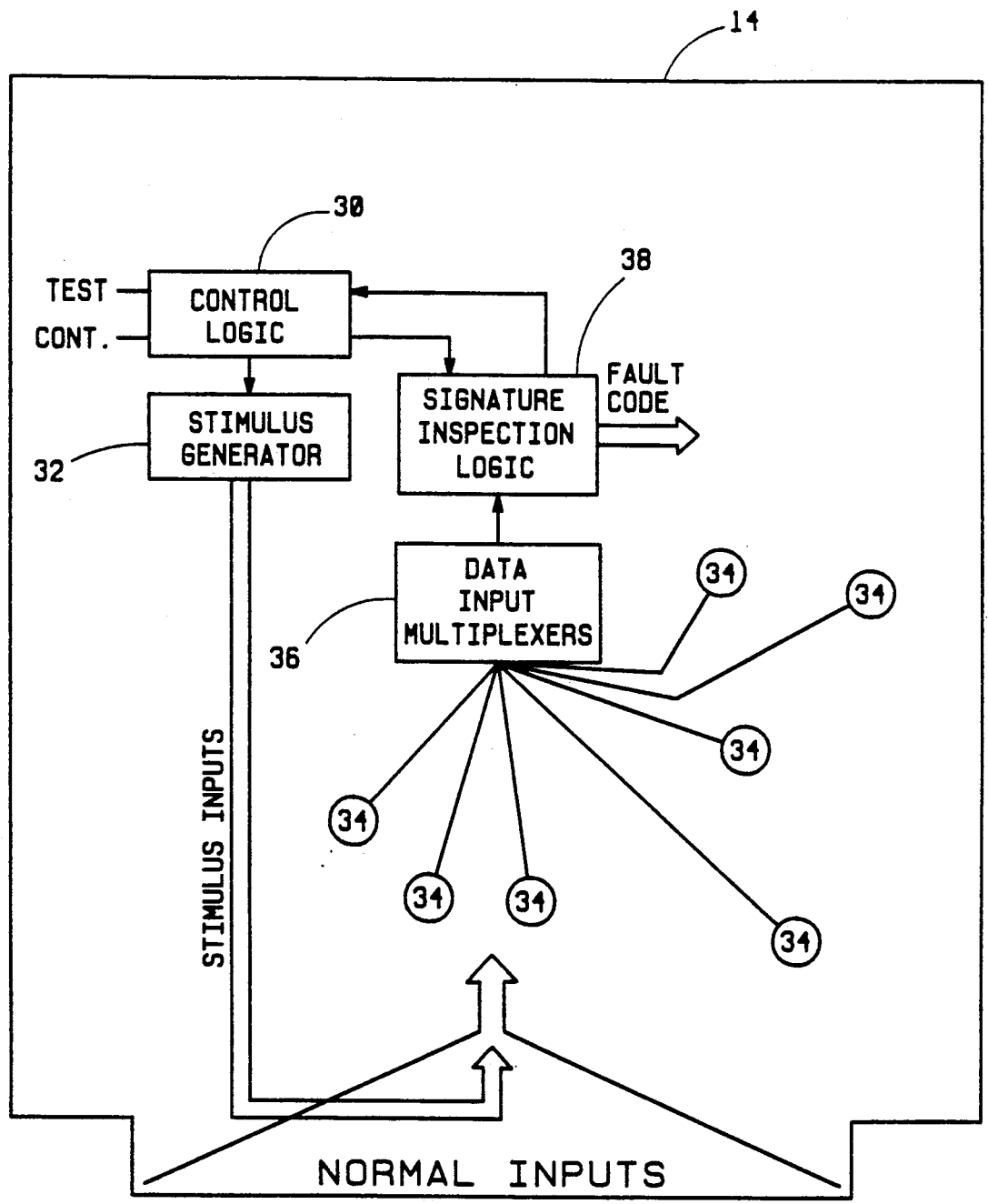
FIG. 5 is a functional diagram of the BITSI hardware.

FIG. 5 shows a functional diagram of the BITSI hardware added to a circuit board under test 14. The BITSI hardware provides the data acquisition and control functions required to perform complete testing of the circuit board These functions include control logic, stimulus generator, signature inspection logic, and data input multiplexers.

When an external TEST signal is received by the control logic 30, it switches the primary inputs of the circuit under test 14 from normal circuit inputs to inputs from the stimulus generator 32. At the same time, a test node 34 on the circuit under test 14 is routed through the data input multiplexers 36 to the input of a 16-bit serial signature analyzer within the signature inspection logic 38. As the stimulus is applied to the circuit under test 14, the resulting circuit response at the test node 34 is clocked into the signature analyzer At the completion of the stimulus, the signature inspection logic 38 compares the measured signature with the expected signature. If the two signatures agree, the test continues by routing the next test node to the signature analyzer and reapplying the test stimulus to the circuit The testing continues in this manner until the measured and expected signatures disagree. When the signatures conflict, the control logic 30 stops the test immediately, the circuit is switched from test mode back to normal mode, and an associated fault code is output from the signature inspection logic 38. The fault code pinpoints the circuit node which generated the error. If the circuit under test 14 contains no faults, all measured signatures will agree with the corresponding expected signatures. Testing is terminated by intentionally storing an expected signature which disagrees with the final measured signature. The fault code associated with this mismatch will indicate that no faults are present.

Figure 6:
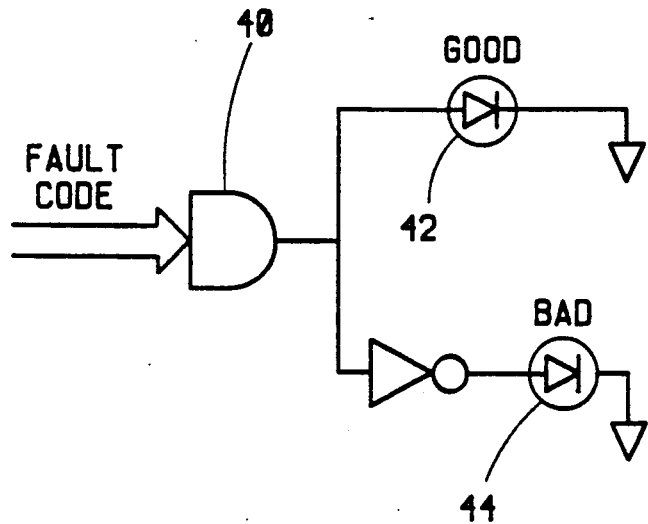
FIG. 6 is a diagram of a go/no-go circuit for use in the output of the BITSI hardware module.

When the BITSI hardware is included on a printed circuit board as shown in FIG. 5, fault diagnostics can be performed in one of two modes: (1) go/no-go mode, or (2) fault isolation mode. The go/no-go mode is illustrated in FIG. 6. Here, the fault code generated by the BITSI hardware is decoded by a simple logic gate 40 which drives two LED indicator lights. At the completion of the printed circuit board test, a code indicating no faults will cause the GOOD LED 42 to be illuminated while any other code will cause the BAD LED 44 to be illuminated. This mode could be used in the field to determine if a printed circuit board is malfunctioning. A bad board could then be sent to a repair depot where the fault isolation mode is used.

The fault isolation mode uses the BITSI fault code to pinpoint the source of a fault. One way to accomplish this is to display the fault code, allowing the user to find the corresponding diagnosis in a repair manual. The system test controller 12, illustrated in FIG. 1 and described above, can be used to automate the repair manual by initiating the BITSI tests on a circuit board and receiving the resulting fault code. The system test controller 1 can then determine the source of the fault and display the diagnosis to the user. As mentioned above, the system test controller 12 could also be implemented in the field at the system level to discriminate between hard faults, intermittent failures, or false indication of failure. The system test controller 12 could be programmed to translate fault codes into operational consequence reports.

Any application which activates BITSI on a circuit board while it is installed in an operating system must consider the effect of circuit output activity while under the influence of the stimulus test vectors. If the stimulus induces unwanted activity into other circuit boards in the system, the outputs must be isolated or disabled during the application of the test vectors.

Figure 7:
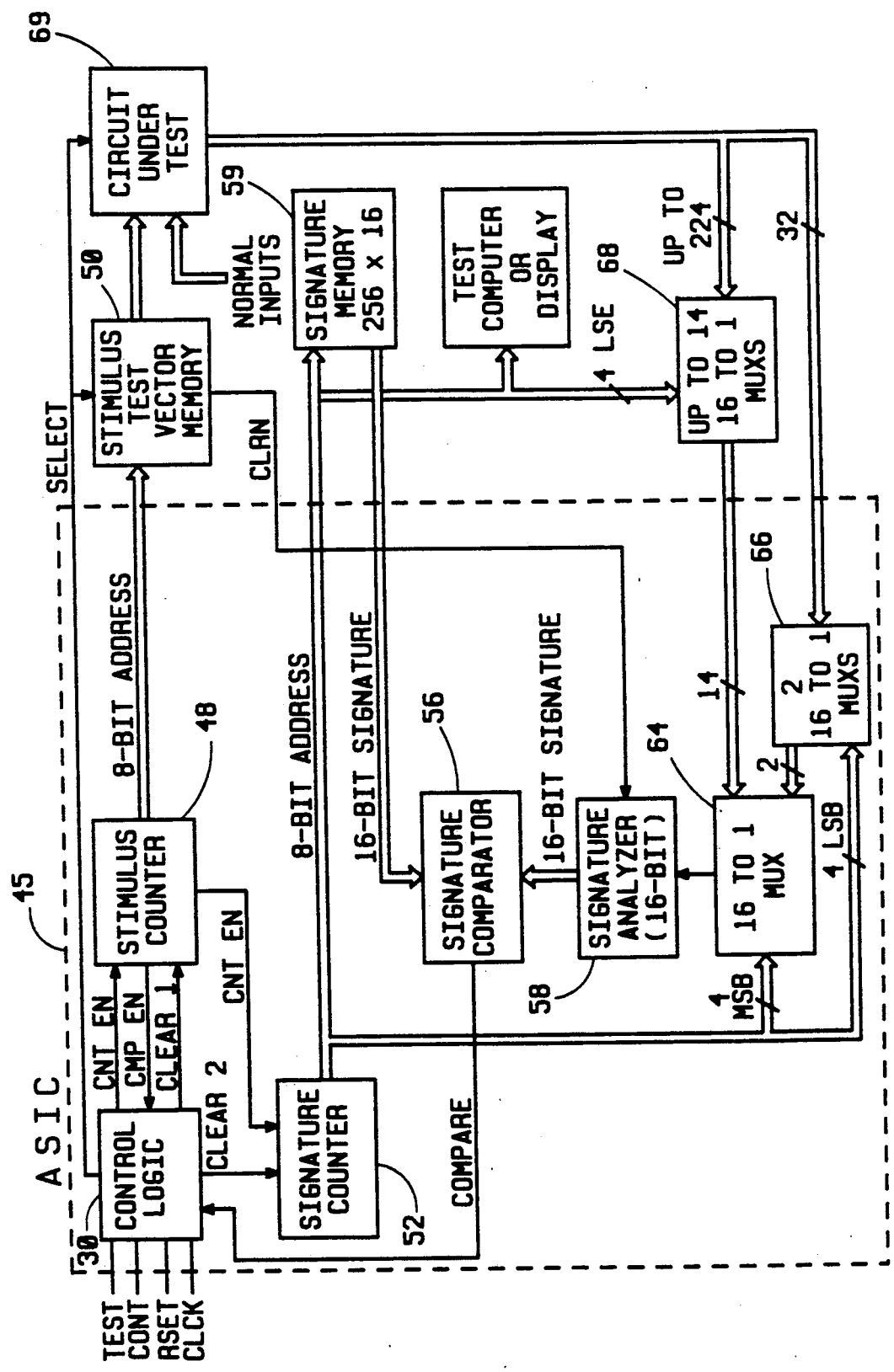
FIG. 7 is a block diagram of the BITSI hardware.

A block diagram illustrating the details of the BITSI hardware is shown in FIG. 7. In the preferred embodiment, the components inside the dashed line are contained on a single ASIC (Application Specific Integrated Circuit) microchip 46. The functions shown outside the dashed line are implemented using standard integrated circuit packages. The major functions of the BITSI hardware are listed in Table 1 below. The table identifies the function by name and lists the blocks from FIG. 7 which implement the function.

TABLE 1

Figure 8:
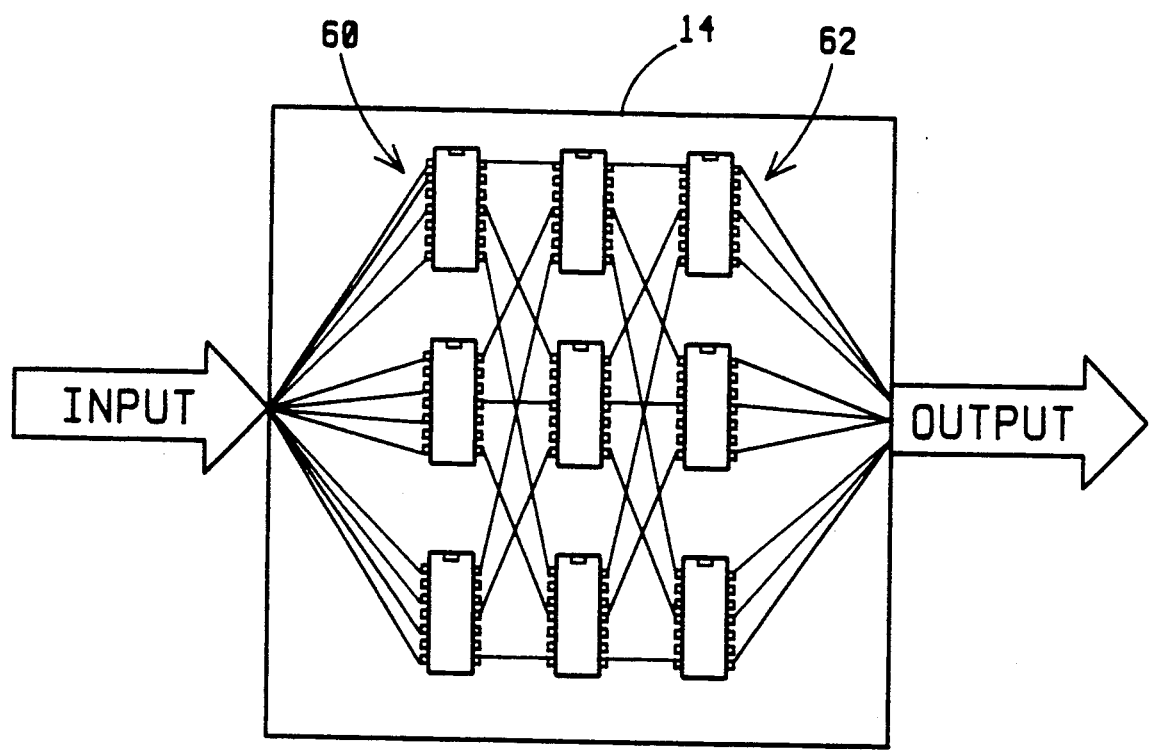
FIG. 8 is a diagram of the BITSI test sequencing.

| MAJOR FUNCTIONS OF BITSI HARDWARE | |
|---|---|
| FUNCTION NAME | BLOCKS FROM FIGURE 8 |
| STIMULUS GENERATOR | STIMULUS COUNTER |
|  | STIMULUS TEST VECTOR MEMORY |
| SIGNATURE INSPECTION LOGIC | SIGNATURE COUNTER |
|  | SIGNATURE MEMORY |
|  | SIGNATURE COMPARATOR |
|  | SIGNATURE ANALYZER |
| DATA INPUT MULTIPLEXERS | ALL MUX BLOCKS |
| CONTROL LOGIC | CONTROL LOGIC |

Each function listed in Table 1 is described in detail below.

Stimulus Generator

In order to use a signature analyzer to compress digital data, the circuit under test 69 must be stimulated in precisely the same way each time a signature is measured. At the beginning of each signature measurement, the circuit must also be set to a known state. These two requirements usually eliminate the normal circuit inputs as a stimulus source. Thus, the need for the stimulus generator.

The stimulus generator is composed of the stimulus counter 48 and the stimulus test vector memory 50 as shown in FIG. 7. The stimulus counter 48 is a binary, 8-b-it counter which drives the address inputs of the stimulus memory 50. With an 8-bit wide address, the stimulus memory 50 can generate up to 256 test vectors, which are applied to the primary inputs of the circuit under test 69.

Implementation of the present invention (BITSI) is an active technique, i.e. the circuit under test requires a special test stimulus which is not required for normal operation. A passive technique can be implemented using normal system inputs during normal system operation (error detecting codes are an example). An active technique requires circuit initialization and is executed off-line or is interleaved during operational "dead-time" periods. In some special applications where normal circuit activity is periodic and involves no random data, BITSI could be implemented as a passive technique.

The type of stimulus programmed into the test vector memory 50 is deterministic, i.e., the stimulus is based on circuit analysis or actual circuit timing data. A deterministic stimulus is based on the designer's knowledge of how the circuit components are interconnected or on measured timing relationships at the primary inputs of the circuit under test 69. The contents of the stimulus test vector memory 50 are specific to each individual circuit under test 69 For this reason, the stimulus memory 50 would not normally be included as part of the ASIC microchip 46. By using external memory chips, the stimulus memory 50 can be easily configured for each individual application.

A pseudo random stimulus, such as the sequence produced by a LFSR, would not be appropriate for a stimulus generator for two reasons. First, random sequences tend to be long in order to adequately exercise all nodes of the circuit under test. Secondly, random test vectors tend to exercise some portions of a circuit while not exercising other portions at all. For example, consider a simple counter circuit with a clear input If a random stimulus is used to exercise all input lines, the counter will probably never reach its terminal count before the reset line is exercised. Thus, the upper range of the counter may never be exercised. The reset line in this example must be deterministically controlled, which is true with most control inputs to a circuit.

The deterministic test vectors are required to initialize the circuit under test 69 to a known state and adequately exercise the circuit during signature measurements If the circuit is not initialized to the same state at the beginning of each signature measurement, unstable signatures will result It does not matter which initial state is established, as long as the same state is set prior to each signature measurement Once the stimulus sequence has successfully established an initial condition, the remaining test vectors stored in the stimulus memory 50 are used to exercise the circuit while the signature analyzer measures the circuit response at various circuit nodes. The CLRN input shown in FIG. 7 is used to reset the signature analyzer while the initialization test vectors are applied to the circuit under test 69 Since the initialization sequence will vary with each application, the CLRN line is most conveniently controlled by the test vector memory 50. Stimulus design techniques are further described in Bergeson, supra.

Signature Inspection Logic

The signature inspection logic is composed of the signature counter 52, signature memory 54, signature comparator 56, and signature analyzer 58. The signature counter 52 may be an 8-bit counter connected in cascade with the stimulus counter 48, together forming a 16-bit counter. Since the signature counter 52 is defined by the upper 8-bits, its count will remain stable during the application of all 256 stimulus test vectors At the completion of the stimulus count, the signature count will be incremented in preparation for the next application of the input test vectors. The purpose of the signature counter 52 is (1) to address the data input multiplexers for routing a test point from the circuit under test 69 to the signature analyzer 58, (2) to address the signature memory 54 which holds the expected signature for the corresponding test point, and (3) the signature count becomes the fault code for pinpointing the fault location.

The signature comparator 56 is used to compare the measured signature obtained from the signature analyzer 58 with the expected signature stored in the signature memory 54. This comparison takes place during the clock cycle in which the stimulus counter 52 is at its maximum value of 255 (FF hex) The result of the comparison is fed to the control logic 30 The control logic 30 will stop the test if the two signatures do not agree If the signatures do agree, the counters 48 and 52 will continue, incrementing the signature counter 52 for the next test node and automatically applying the test stimulus.

Since the signature memory 54 is addressed with 8-bits, it can hold up to 256 16-bit signatures. However, not all 256 signature need be implemented. To stop the test after the final signature has been measured, the memory location following the final signature is programmed with a dummy signature, which will disagree with the output of the signal analyzer 58. The resulting fault code produced by the dummy signature will indicate that no failures have occurred on the circuit under test 69.

The contents of the signature memory 54 depend on the signatures generated for the circuit under test 14. Since the signatures depend on the stimulus and the particular circuit under test, the contents of the memory 54 will change with each application. For this reason, the signature memory 54 would normally not be included as part of the ASIC microchip 46. By using external memory chips, the signature memory 54 can be easily configured for each individual application.

In order to determine the contents of the signature memory 54, test points must first be selected on the circuit under test 69. Successful BITSI implementation depends on proper selection of test points and multiplexing them to the signature analyzer 58 in a specific order. Since fault isolation to an individual circuit node is achieved by simply observing the signature count, signature measurements must proceed through the circuit in a carefully chosen sequence.

In the traditional approach to signature analysis, signatures at the primary outputs are first measured. If any of the output signatures are wrong, the bad signatures are traced from the output toward the input, until a component is found which has good input signatures and bad output signatures. As each signature is measured, a decision must be made as to which circuit node to probe next. Although this technique is direct and requires the fewest signature measurements to arrive at the faulty node, it requires an extensive data base to implement the many possible circuit traversal paths.

The BITSI approach eliminates the need for on-line circuit traversal decisions by starting at the opposite end of the circuit, as shown in FIG. 8. Signatures at the primary inputs 60 are checked first, thus, automatically testing the stimulus generator and test circuitry. Signatures are then measured from primary inputs toward the primary outputs 62 in an exhaustive manner. Since individual components are tested from input to output, the first bad signature encountered will automatically isolate a faulty node without making any on-line traversal decisions. The circuit is not declared good until all test points on the board have generated a good signature. By measuring all signatures on the board, the stimulus is not required to propagate faults to a primary output, resulting in stimulus simplification. Although more signature measurements may be required to isolate a fault using the BITSI technique, the overall test circuitry is greatly simplified and fault coverage is also increased.

An algorithm for determining the order of signature measurements is given in Table 2. The term "circuit element" is defined as an individual component with inputs and outputs, regardless of package considerations. For example, an individual AND gate is considered a circuit element even though it may share a common package with three other gates.

TABLE 2

SIGNATURE ORDER ASSIGNMENT ALGORITHM

STEP 1: Take signatures on all primary inputs of the circuit. This will test the BITSI hardware (i.e., the test circuitry).

STEP 2: Move to a circuit element which has all input signatures checked from step 1 or 2. Take signatures on all outputs of this circuit element. Repeat this step until all circuit element outputs have been checked. (Note: unused outputs need not be included).

The existence of a feedback loop within the circuit under test 69 poses a problem in defining circuit test points. A fault occurring on a component within a feedback loop will be propagated around the loop, making fault isolation to any circuit element within the loop impossible. One solution to this problem is to treat the feedback loop as a single circuit element with a set of inputs and a set of outputs A fault can then be isolated to the group of circuit elements forming the loop. If this group of components is large, the only other choice is to break the feedback path. The preferred way to break the path is with tri-state logic at the feedback pick-off point The feedback input is then treated as a primary input driven from the stimulus generator (also implemented with tri-state outputs) Multiplexers could also be used to break feedback loops; however, they represent additional components which can be eliminated by using tri-state circuitry. Feedback loops are a common problem in built-in-test systems.

Once the test points have been defined, the signature at each test point must be determined through measurement or by circuit simulation. Actual measurement would require stimulating the circuit and measuring the 16-bit signature at each test point An easier way to accomplish this is by computer simulation of the circuit under test. A circuit simulator can easily produce the expected signatures when the stimulus test vectors are used to drive the simulated circuit. After obtaining the expected signatures for each test point of the circuit, the signatures can be programmed into the signature memory.

Data Input Multiplexers

The input data stream into the signature analyzer 58 is taken from the defined test points 34 on the circuit under test 69. The test points 34 (or nodes) are hard-wired to a group of input MUX's (multiplexers) 64, 66, and 68. Two 16-to-1 multiplexers 64 and 66 are shown internal to the ASIC microchip 46. Up to 46 test nodes 34 can be routed to the signature analyzer 58 without adding external multiplexer circuits. In applications requiring board level go/no-go tests only (fault detection without fault isolation), 46 test points may be adequate. However, if fault isolation to individual circuit nodes on the board is required, then every node which defines a component input or output must be fed to the signature analyzer 58. To achieve this level of fault isolation, at least one external multiplexer 68 would likely be required. Up to 256 test points can be routed to the signature analyzer 58 using up to 14 external 16-to-1 multiplexer chips. The exact number of external multiplexers required will depend on each application. As the number of tested circuit nodes decreases, the number of external multiplexers required will also decrease.

With the BITSI methodology there is a trade-off decision to be made: fault resolution vs. added multiplexer real estate. If maximum fault resolution is required, i.e., fault isolation to the circuit node level, this may require the maximum use of external multiplexers. In some applications, it may be acceptable to isolate faults to a small group of components rather than to a single circuit node. This small group of components would be called a partition group. For example, the circuit under test could be divided into partition groups of three or four components. Each partition group would be treated as a circuit element with a set of inputs and a set of outputs. Test points would be selected exactly the same as discussed in the previous section; however, now each circuit element is defined as a single partition group. The number of test points will be significantly reduced, resulting in fewer external multiplexer chips Fault resolution will also decrease since fault codes will now pinpoint partition groups rather than circuit nodes. To correct the fault, all the components composing the partition group must be replaced.

Some applications may only require a go/no-go test in the field, with maximum fault resolution tests required at the repair depot BITSI provides the flexibility to implement both In this situation, the circuit under test is implemented with the go/no-go test hardware, utilizing no external multiplexers. This reduces the test hardware real estate to a minimum. The test points required to achieve maximum fault resolution are simply routed to a connector on the circuit under test. When a defective board is sent to the repair depot, a test module containing the additional multiplexer chips is connected to the circuit under test. The fault can now be isolated to a circuit node. This approach can be used to reduce the size of the circuit under test to a minimum, while providing the full benefits of BITSI at the repair depot.

The BITSI methodology does not add test hardware or delays in the normal data path of the circuit under test 14. The test points 34 are simply "picked off" and routed through the data multiplexers 36 without effecting the circuit during normal operation.

Control Logic

Figure 9:
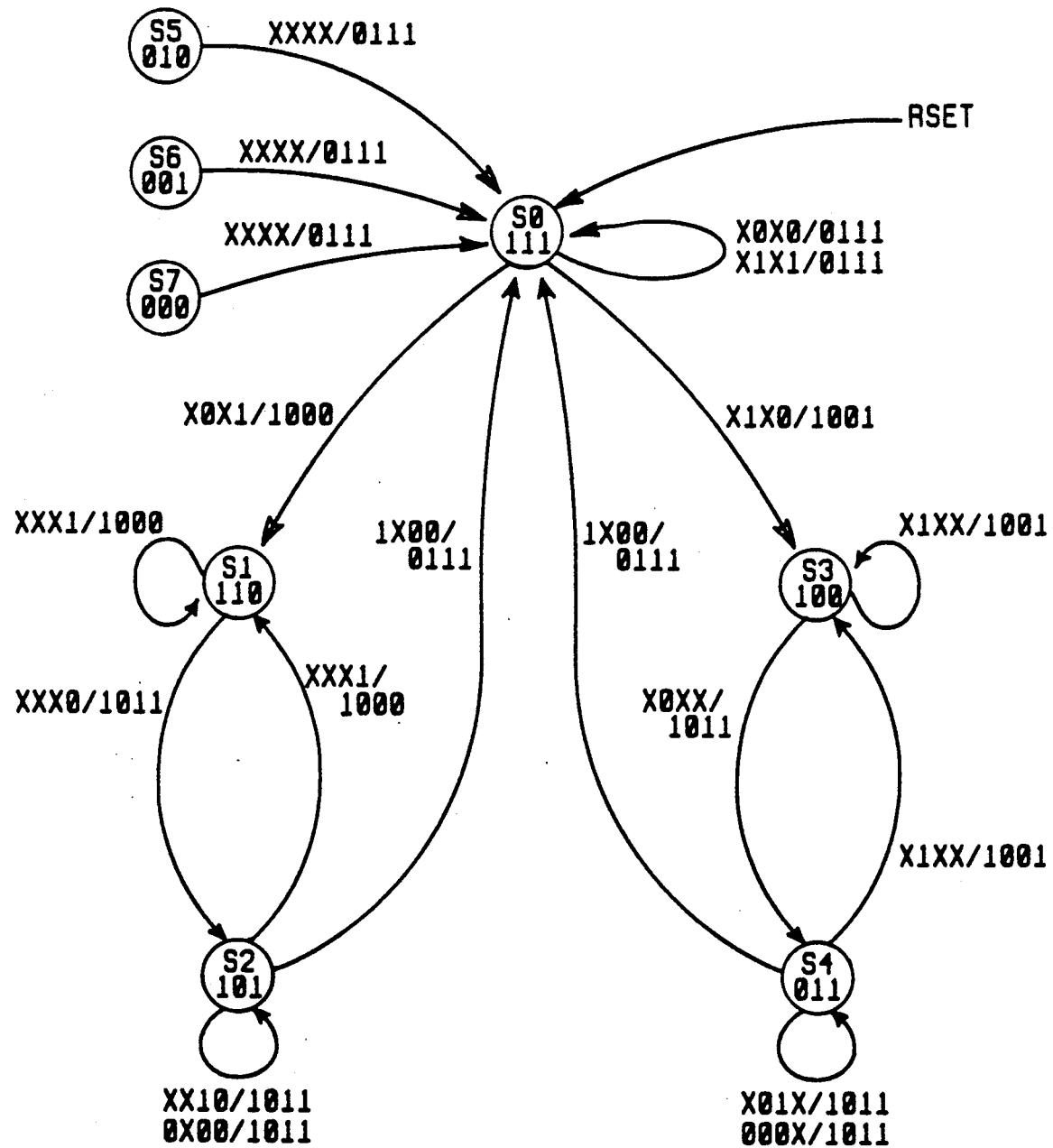
FIG. 9 is a state diagram for the control logic.

The control logic 30 shown in FIG. 7 is responsible for controlling the overall test. The function of the control logic 30 is best described by the state diagram shown in FIG. 9. In this diagram, a state is represented by a circle and the transition between states is indicated by directed lines connecting the circles. The binary number inside each circle identifies the state each circle represents. The directed lines of a state diagram are labeled with two binary numbers separated by a slash. The number occurring before the slash is the input value which causes the state transition; the number after the slash gives the value of the outputs after the state transition. As shown in FIG. 9, the control logic has four inputs and four outputs. The inputs are COMPARE, CONTINUE, COMPARE ENABLE, and TEST. The outputs are SELECT, COUNT ENABLE, CLEAR1, and CLEAR2. For example, a directed line labeled X0X1/1000 defines the inputs and outputs as shown below. The X symbols are defined as "don't care" values, i.e., it doesn't matter if these lines are 0 or 1.

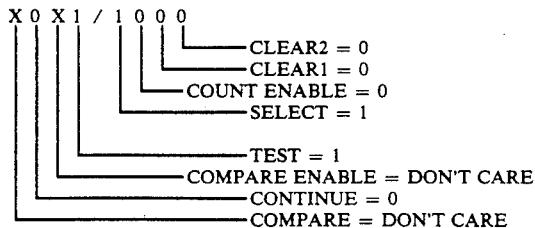

The purpose of each input and output is defined in Table 3. Reference to the various states will be given by labels S0 through S7, rather than by the actual binary value of the state. These state labels are also given in FIG. 9.

TABLE 3

| \multicolumn{3}{c}{CONTROL LOGIC INPUTS AND OUTPUTS} |
| NAME | FUNCTION | DESCRIPTION |
| --- | --- | --- |
| COMPARE | INPUT | This is an input to the Control Logic from the Signature Comparator. When COMPARE = 0, the expected and measured signatures are equal. When COMPARE = 1 the signatures are not equal. |
| CONTINUE | INPUT | External input from operator switch or system test controller. Actuation of CONTINUE will start the test sequence from the last signature measured. Actuation is defined as transition from 0 to 1, then back to 0. |
| COMPARE ENABLE | INPUT | Input to the Control Logic from the Stimulus Counter. When COMPARE ENABLE = 0, the measured signature has been captured and is ready for comparison with expected signature. |
| TEST | INPUT | External input from operator switch or system test controller. Actuation of TEST will start the test sequence from the beginning (first signature). Actuation is defined as transition from 0 to 1, then back to 0. |
| SELECT | OUTPUT | Output from Control Logic to circuit under test and to Stimulus Memory. When SELECT = 1, Control Logic is in test mode. When SELECT = 0 the Control Logic is inactive and the circuit under test is operating normally. SELECT is intended to control tristate logic for switching between normal circuit inputs and test vector inputs. SELECT is also used to control the breaking of feedback loops on the circuit under test. |
| COUNT ENABLE | OUTPUT | Output from Control Logic to Stimulus Counter. Enables the Stimulus Counter during testing. |
| CLEAR1 | OUTPUT | Output from Control Logic to Stimulus Counter. The Stimulus Counter is cleared when CLEAR1 = 0. |
| CLEAR2 | OUTPUT | Output from control logic to the Signature Counter. The Signature Counter is cleared when CLEAR2 = 0. |

State S0 in FIG. 9 is the standby state. While in this state, the BITSI hardware will be inactive and normal circuit inputs will drive the circuit under test. The BITSI hardware will remain in state S0 until a transition occurs on the CONTINUE input or on the TEST input. When the TEST input transitions from 0 to 1, the BITSI hardware will move to state S1. The SELECT output will go high, switching from normal circuit inputs to stimulus inputs. COUNT ENABLE, CLEAR1, and CLEAR2 will all go low, clearing the stimulus and signature counters and enabling the stimulus counter. The control logic will remain in state S1 until the TEST input returns from 1 to 0. It should be noted that if TEST is provided from a mechanical switch, contact bounce may cause several transitions between S1 and S2. This is normal and the state of the circuit will eventually stop in state S1. When TEST returns to the low state, the control logic will move from state S1 to S2. Again contact bounce may cause several transitions between state S2 and S1; however, these transitions will eventually stop in state S2. The SELECT and COUNT ENABLE output will remain high and low, respectively. The CLEAR1 and CLEAR2 outputs will return to the high state, allowing the stimulus counter and signature counter to begin from zero. The control logic will remain in state S2 until a measured signature is found to disagree with the corresponding signature stored in the signature memory. While in state S2, the counters will free run, repeating the entire stimulus sequence for each increment of the signature counter. A bad measured signature is detected when the COMPARE input is high while the COMPARE ENABLE input is low. This condition will cause a transition from state S2 back to the standby state S0. The SELECT and COUNT ENABLE outputs will return to their inactive state, returning control to the normal circuit inputs. The signature counter will hold the count corresponding to the last signature measured. This count is used to determine the location of the fault (or no fault condition).

The right side of the state diagram involving states S3 and S4 is similar to the left side with two minor modifications: (1) state S3 is entered by actuation of the CONTINUE input rather than the TEST input, (2) only the stimulus counter is reset, allowing the test to continue from the last measured signature.

The state diagram of FIG. 9 requires five states to totally define circuit operation (S0 thru S4). The state assignment given in the diagram requires three binary digits (bits). Since three binary digits can define up to eight states, there is a potential that the control logic may inadvertently enter one of the three unused states. To gracefully exit these undefined states, they must be defined. Thus, states S5, S6, and S7 and a power-on reset have been defined in FIG. 9. If any of these states are entered for any reason, they will transition to state S0 on the next clock cycle. The power-on reset input, RSET, will assure that state S0 is entered each time the power is applied to the control logic.

FAULT ISOLATION ISSUES

Figure 10:
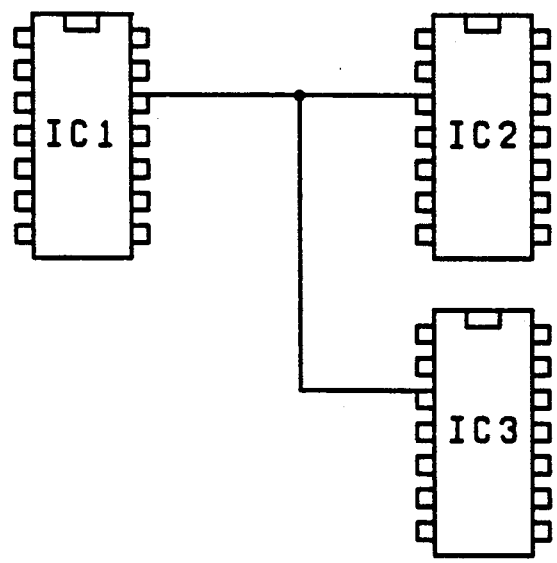
FIG. 10 is a typical circuit node.

Maximum fault resolution using the BITSI methodology is isolation to a circuit node. A typical circuit node is shown in FIG. 10, defined by IC1 pin 12 driving two inputs at IC2 pin 3 and IC3 pin 3. If a bad signature is detected at this node, it becomes impossible to determine which of the three chips is the source of the fault without physically disconnecting each chip from the other two. Thus, the components IC1, IC2, and IC3 form an "ambiguity group". A bad signature at a circuit node isolates the fault to at least one of the following sources: (1) one or more of the components connected to the node; (2) one or more of the traces forming the node; and/or (3) one or more of the connections forming the node. Typically, a repairman must determine which of these three conditions has caused the fault. After inspecting the node connections an traces, he may be required to replace all components forming the ambiguity group.

In the situation where an system test controller 12 is used to predict the consequences of a fault, node level fault isolation is the desired resolution. In this situation, the system test controller 12 must determine how a fault propagates through the system from the faulty node. It is not important to know which member of the ambiguity group has caused the fault.

A partition group is used to decrease the number of external multiplexers at the expense of reduced fault resolution. The ambiguity group concept applies the same to partition groups as it does to individual components. The individual components shown in FIG. 10 could just as easily be replaced by a block representing a partition group. A fault on the node connecting two partition groups could be caused by any component within the driving partition group, or by an input component of a receiving partition group. In this situation, the ambiguity group includes the components within the driving partition group, plus input components of the receiving partition groups. When dealing with partition groups, notice that fault resolution is still to the circuit node; however, signature measurements are not made at every circuit node.

The embodiments of the invention in which an exclusive property or privilege is claimed are defined as follows:

1. A system for fault detection in a digital circuit having input and test points, said system for fault detection comprising:
   control logic means coupled to the circuit under test where said control logic means is capable of controlling the overall test by responding to a signature inspection logic means when said signature inspection logic means detects a fault in the circuit by comparing the response of a test generated signal with an expected signal response,
   a stimulus generator coupled to the input of the circuit and said control logic means which is responsive to said control logic means and is capable of sending stimulus vector signals to the input of the circuit where said stimulus generator includes: a stimulus counter linked to a stimulus test vector memory,
   a data input multiplexer means coupled to the test points on the circuit,
   signature inspection logic means coupled and responsive to said data input multiplexer, said signature inspection logic means capable of comparing a signal received from said data input multiplexer to an expected signal where said signature inspection logic means includes: a signature analyzer coupled and responsive to said data input multiplexer means and said stimulus test vector memory, a signature counter coupled and responsive to said control logic means and said stimulus counter, a signature memory coupled and responsive to said signature counter, said signature memory capable of storing expected signals associated with each test point of the circuit, and a signature comparator coupled and responsive to said signature analyzer and said signature memory, said signature comparator capable of sending a signal to said control logic means upon detection of a signal from said signal analyzer that does not match an expected signal from said signature memory, 2. A system for fault detection in a digital circuit having input and test points, said system for fault detection comprising:
   a stimulus generator coupled to the input of the circuit under test and capable of sending stimulus vector signals to the input of the circuit,
   a data input multiplexer means coupled to the test points on the circuit,
   signature inspection logic coupled and responsive to said data input multiplexer, said signature inspection logic capable of comparing a signal received from said data input multiplexer to an expected signal, and
   control logic coupled to the circuit, said signature inspection logic and said stimulus generator, said control logic capable of enabling imitation of generation of a stimulus signal from said stimulus generator, and further in which said control logic is capable of signaling detection of fault in the circuit if comparison of a signal by said signature inspection logic does not match with the expected signal, whereby fault can be detected in the circuit;

wherein said stimulus generator includes a stimulus counter coupled and responsive to said control logic and coupled to said signature inspection logic, a stimulus test vector memory coupled to said stimulus counter, said signature inspection logic and the circuit under test, said stimulus test vector memory capable of storing stimulus vectors corresponding to the input and test points of the circuit under test, and further wherein said stimulus counter is capable of generating stimulus vector address signals for the input of the stimulus test vector memory;

wherein which said signature inspection logic includes a signature analyzer coupled and responsive to said data input multiplexer means and said stimulus test vector memory, a signature counter coupled and responsive to said control logic and said stimulus counter, a signature memory coupled and responsive to said signature counter, said signature memory capable of storing expected signals associated with each test point of the circuit, a signature comparator coupled and responsive to said signature analyzer and said signature memory, said signature comparator capable of sending a signal to said control logic upon detection of a signal from said signature analyzer that does not match an expected signal from said signature memory;

wherein said data input multiplexer means includes an external data input multiplexer means includes an external data input multiplexer coupled to the test points on the circuit, and an internal data input multiplexer means coupled to said external data input multiplexer and capable of sending a signal to said signature analyzer.

3. The system of claim 2 in which said signature inspection logic also includes means for determining a fault location and further in which said control logic is capable of conveying a signal that identifies the fault location.

4. The system of claim 3 including a system test controller coupled to said control logic and said signature inspection logic, said system test controller capable of initating fault detection and recording the detection of faults.

5. The system of claim 4 in which said control logic, said stimulus counter, said signature counter, said signature comparator, said signature analyzer, and said internal data input multiplexer are contained on a single application specific integrated microchip.

6. A means for fault detection in a system having a plurality of circuits and in which each circuit has inputs and test nodes, said means for fault detection in a system comprising:

a system test controller coupled to each circuit of the plurality of circuits of the system, a stimulus generator coupled to the input of each circuit of the plurality of circuits, said stimulus generator capable of sending a stimulus vector signal to the input of each circuit of the plurality of circius where said stimulus generator includes: a stimulus counter coupled to a stimulus test vector memory where said stimulus counter is capable of addressing the input of said stimulus test vector memory where said stimulus test vector memory is capable of storing stimulus vectors corresponding to the input and test points of each circuit of the plurality of circuits under test, a data input multiplexer means coupled to the test points on each circuit of the plurality of circuits, signature inspection logic means coupled and responsive to said data input multiplexer means, said signature inspection logic means capable of comparing a signal received from said data input multiplexer means to an expected signals where said signature inspection logic means includes: a signature analyzer coupled to and responsive to said data input multiplexer means and said stimulus test vector memory, a signature counter coupled and responsive to a control logic means and said stimulus counter, a signature memory capable of storing expected signals associated with each test point of each circuit of the plurality of circuits, a signature comparator coupled and responsive to said signature analyzer and said signature memory, said signature comparator capable of sending a signal to said control logic upon detection of a signal from said signature analyzer that does not match an expected signal from said signature memory, and control logic means coupled to each circuit of the plurality of circuits, said signature inspection logic means and said stimulus generator, said control logic means capable of enabling initiation of generation of a stimulus vector signal from said stimulus generator, and further in which said control logic means is capable of signaling detection of fault in each circuit of the plurality of circuits if comparison of a signal by said signature inspection logic does not match with the expected signal, whereby fault can be detected in each circuit of the plurality of circuits.

7. The means for fault detection of claim 6 in which said data input multiplexer means includes:

an external data input multiplexer coupled to the test points on each circuit of the plurality of circuits, and an internal data multiplexer means coupled to said external data input multiplexer and capable of sending a signal to said signature analyzer.

8. The means for fault detection of claim 7 in which said signature inspection logic also includes means for determining a fault location in a circuit and further in which said control logic is capable of conveying a signal that identifies the fault location.

9. The means for fault detection of claim 8 in which said control logic, said stimulus counter, said signature counter, said signature comparator, said signature analyzer, and said internal data input multiplexer means are included on each circuit of the plurality of circuits.

10. The means for fault detection of claim 9 in which each circuit of the plurality of circuits includes a application specific integrated circuit microchip that includes said control logic, said stimulus counter, said signature counter, said signature comparator, said signature analyzer, and said internal data input multiplexer means.

11. In a system for fault detection in a circuit, the system including a circuit havng an input and test points, a stimulus test vector memory containing stimulus vectors for the input of the circuit, and a signature memory containing an expected signature signal for each test point of the circuit, a built-in test by signature inspection module comprising:

control logic, a stimulus counter coupled and responsive to said control logic, and also coupled to the stimulus test vector memory, said stimulus counter and stimulus test vector memory are capable of generating a stimulus vector signal for the input of the circuit associated with each test point of the circuit, a data input multiplexer coupled to the test points of the circuit and which includes: an external data input multiplexer coupled and responsive to the signature counter and the test points of the circuit and in which said data input multiplexer is coupled and responsive to the external data input multiplexer a signature analyzer coupled and responsive to said data input multiplexer and the stimulus test vector memory, a signature counter coupled to said control logic and said stimulus counter, said signature counter capable of signaling the signature memory, a signature comparator coupled and responsive to said signature analyzer and the signature memory, said signature comparator capable of sending a signal to said control logic upon detection of a signal from said signature analyzer that does not match an expected signature signal from the signature memory.

12. The built-in test by signature inspection module of claim 11 in which the module is included on a single application specific integrated microchip.

13. A method for detecting faults in a circuit having a circuit input and test points, the method comprising:

sending a stimulus vector signal to the circuit input from a stimulus generator, receiving a signal from a test point of the circuit in response to the stimulus signal, comparing the signal received from the test point to an expected signal associated with that test point stored in a signature memory, indicating that a fault exists in the circuit if the signal received from the test point does not match the expected signal stored in the signature memory, stopping the test if the signal received from the test point does not match the expected signal stored in the signature memory, performing fault diagnosis in the go/no-no mode when the purpose of the test is to accept or reject the entire circuit and where LED indicator lights describes the circuit as good or bad, performing fault diagnosis in a fault isolation mode when the purpose of the test is to pinpoint the fault's location within the circuit, means for operating said stimulus generator using an active technique where a special test stimulus is generated, and means for testing said circuit using a passive technique by applying normal system inputs during normal system operation.

14. The method of claim 13 in which the step of sending a stimulus vector signal to the circuit is preceded by:

identifying a set of test nodes on the circuit under test wherein a specific test node identifies with a specific vector signal, and identifying a predetermined order for examination of the test nodes by a signature analyzer.

15. The method of claim 14 including the step of: indicating the location of the test point at which a fault exists based on said predetermined order of test node examination and the contents of a signature counter at the time the test was terminated by a control logic means.

16. The method of claim 15 in which fault detection of test points on the circuit proceeds according to a predetermined order from an input side of the circuit to an output side such that the first incorrect signature encountered will pinpoint the location of a fault.

* * * * *